UNITED STATES PATENT OFFICE.

JULIUS STOCKHAUSEN, OF CREFELD, GERMANY.

FUNGICIDE.

982,162.  Specification of Letters Patent.  Patented Jan. 17, 1911.

No Drawing.  Application filed March 31, 1910.  Serial No. 552,724.

*To all whom it may concern:*

Be it known that I, JULIUS STOCKHAUSEN, a subject of the German Emperor, residing at Crefeld, Germany, have invented a new and useful Fungicide; and I do hereby declare the following to be a full, clear, and exact description of the same.

The known emulsions or solutions of organic chlorids, mineral oils and the like with emulsifying or solvent means such as soap or turkey-red oil, are not directly applicable for the combating of vegetable blights or pests, because they may easily destroy or injure the tender shoots and buds of the plants treated therewith especially when applied in large quantities.

The present invention is based upon the observation that the harmful effects arise from the dissociation and alkali-liberation of the emulsifying or solvent means upon their solution in water and these harmful effects may be obviated if this dissociation be rendered impossible by employing as emulsifying or solvent means such fatty and sulfonated fatty acid compounds as do not liberate free alkali through dissociation upon solution in water. In the simplest case this is effected by using as the emulsifying or solvent means fatty or sulfonated fatty acid compounds of the heavy metals, especially of copper, whereby at the same time a longer adherence of the liquid to the treated plants and other objects is obtained. Moreover, a more advantageous and effective medium is produced if the fatty or sulfonated fatty acid compounds of the heavy metals are re-dissolved by treatment with ammonia or the like. Furthermore there may be used fatty or sulfonated fatty acid compounds which are neutralized with ammonia instead of with caustic alkali, with or without the addition of copper compounds. There may also be employed as the emulsifying or solvent medium castor oil soap preferably neutral which does not dissociate and therefore does not injure the shoots and buds. The soaps of other oxyacids act in the same way.

For the production of the new emulsions or solutions even simple mixtures of organic chlorids and the like with non-aqueous liquids of low specific gravity, *e. g.* petroleum, can be employed without the addition of alkali-liberating soaps; this also presents the advantage that the mixing liquid is of approximately the same density as water and therefore, because of the closely corresponding specific gravity, emulsifies with the subsequently added aqueous solution of copper or calcium compounds and in a degree sufficient in practice for the present object.

The carrying out of the process may be effected for example as follows:—Carbon tetrachlorid is emulsified or brought into solution in the known manner by means of an aqueous solution of the soap produced by the treatment of sulfonated castor oil or analogous sulfonated fats, oils, fatty acids and oily acids with excess of an alkali, for example, potash, soda or ammonia at comparatively high temperature. The preferred proportions of the ingredients are as follows:—26.5 kg. of the soap described in United States Patents 585347 and 646326 are dissolved in 26.5 kg. water and mixed with 18 kg. carbon tetrachlorid. Hereto there is added 3 kg. copper sulfate dissolved in 19.5 kg. of water until a thick paste or pulp is obtained which is dissolved by 6.5 kg. concentrated ammonia liquid. The temperature of mixing is not material. The solution obtained is then treated with copper sulfate until there is no further precipitation, that is until the whole of the fatty acid compound has been changed to a salt of copper. Ammonia is added until the previously separated precipitate is re-dissolved.

The disinfectant obtained in this way is very effective even when largely diluted with water, because it penetrates very thoroughly into the material to be treated; the hydrocarbon chlorid is also retained very firmly in the solution and does not evaporate so quickly even after the evolution of the ammonia, so that it can exert its deadly effect after a longer time and in consequence of its slower evaporation the disinfectant is less dangerous for the user than other substances of a similar nature and function.

Instead of carbon tetrachlorid, tetrachlorethane, pentachlorethane, trichlorethylene, perchlorethylene or the like can be used.

What I claim and desire to secure by Letters Patent is,—

1. A composition of matter, comprising carbon tetrachlorid and soap of copper.

2. A composition of matter, comprising carbon tetrachlorid and a sulfonated fatty acid compound of copper.

3. A process for the production of a disinfectant, comprising treating carbon tetrachlorid with aqueous soap solution and a copper salt.

4. A process for the production of a disinfectant, comprising treating carbon tetrachlorid with turkey-red oil and a copper salt.

5. A process for the production of a disinfectant, comprising treating sulfonated castor oil with excess of alkali and adding thereto carbon tetrachlorid and a copper salt.

6. A process for the production of a disinfectant, comprising treating carbon tetrachlorid with aqueous soap solution, a copper salt and ammonia.

7. A process for the production of a disinfectant, comprising treating sulfonated castor oil with excess of alkali and adding carbon tetrachlorid, a copper salt and ammonia.

8. A process for the production of a disinfectant, comprising treating sulfonated castor oil with excess of alkali at a high temperature and adding carbon tetrachlorid, a copper salt and ammonia.

In testimony whereof, I have signed my name to this specification in the presence of two subscribing witnesses.

JULIUS STOCKHAUSEN.

Witnesses:
HENRY GUADFLIEG,
ELISE KALBURSH.